(12) United States Patent
Klimpel

(10) Patent No.: US 10,710,728 B2
(45) Date of Patent: Jul. 14, 2020

(54) DEVICE FOR DETERMINING AT LEAST ONE OF A DEGREE OF OPENING OF AN AIR OPENING AND A CROSS SECTION OF AN AIR DUCT CONNECTED TO THE OPENING

(71) Applicant: AIRBUS OPERATIONS GMBH, Hamburg (DE)

(72) Inventor: Frank Klimpel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 139 days.

(21) Appl. No.: 15/286,233

(22) Filed: Oct. 5, 2016

(65) Prior Publication Data
US 2017/0096227 A1    Apr. 6, 2017

(30) Foreign Application Priority Data
Oct. 6, 2015 (DE) .......................... 10 2015 219 286

(51) Int. Cl.
| | |
|---|---|
| B64C 1/14 | (2006.01) |
| B64D 13/00 | (2006.01) |
| B64D 33/02 | (2006.01) |

(52) U.S. Cl.
CPC .............. B64D 13/00 (2013.01); B64C 1/14 (2013.01); B64D 33/02 (2013.01); *Y02T 50/56* (2013.01)

(58) Field of Classification Search
CPC ... B64D 13/00; B60R 21/01526; F16K 3/188; F16K 3/207; F16K 21/12; F16K 11/105; F16C 2270/0554; B64C 1/14
(Continued)

(56) References Cited

U.S. PATENT DOCUMENTS 2,721,446 A * 10/1955 Bumb ....................... F15B 1/24
                                                                138/31
3,265,331 A    8/1966 Miles
(Continued)

FOREIGN PATENT DOCUMENTS

DE    689 08 050 T2    11/1993
DE    103 35 482 B4    5/2005
(Continued)

OTHER PUBLICATIONS

German Search Report for Application No. 10 2015 219 286.5 dated Apr. 11, 2016.
(Continued)

*Primary Examiner* — Grant Moubry
*Assistant Examiner* — Ryan L Faulkner
(74) *Attorney, Agent, or Firm* — Jenkins, Wilson, Taylor & Hunt, P.A.

(57) ABSTRACT

A device for controlling an opening forming an air inlet or air outlet in an outer skin of a vehicle. The device comprises a multiple-member inlet ramp, which is configured to vary at least one of a degree of opening of the opening and a cross section of an air duct connected to the opening; an actuator, which is coupled to the multiple-member inlet ramp and is configured to move the multiple-member inlet ramp into a shape related to at least one of a certain degree of opening and a certain cross section; and a movement control device, which is configured to control a movement of the multiple-member inlet ramp.

15 Claims, 3 Drawing Sheets

(58) Field of Classification Search
USPC .......................................................... 454/73
See application file for complete search history.

(56) References Cited

U.S. PATENT DOCUMENTS

| | | | | |
|---|---|---|---|---|
| 4,595,158 | A | * | 6/1986 | Robinson .................. B64C 9/02 244/223 |
| 5,026,004 | A | | 6/1991 | Dobie et al. |
| 5,301,901 | A | | 4/1994 | Kutschenreuter, Jr. |
| 5,820,162 | A | * | 10/1998 | Fink ...................... B60R 21/205 137/68.13 |
| 7,222,819 | B1 | | 5/2007 | Kelnhofer |
| 7,510,150 | B2 | * | 3/2009 | Williams .................. B64C 9/02 244/211 |
| 8,360,358 | B2 | | 1/2013 | Klimpel |
| 8,393,566 | B2 | | 3/2013 | Siercke et al. |
| 8,794,018 | B2 | | 8/2014 | Gleine |
| 2014/0295747 | A1 | * | 10/2014 | Schmid .................. B64D 13/00 454/76 |
| 2015/0284099 | A1 | * | 10/2015 | Telgkamp .............. B64D 13/00 454/76 |

FOREIGN PATENT DOCUMENTS

| | | |
|---|---|---|
| DE | 10 2008 005 700 A1 | 7/2009 |
| DE | 10 2008 026 877 B3 | 7/2009 |
| DE | 10 2009 043 797 A1 | 3/2011 |
| EP | 2927129 | 10/2015 |

OTHER PUBLICATIONS

Extended European Search Report for European Application No. 16190541.9 dated Mar. 15, 2017.

* cited by examiner

DEVICE FOR DETERMINING AT LEAST ONE OF A DEGREE OF OPENING OF AN AIR OPENING AND A CROSS SECTION OF AN AIR DUCT CONNECTED TO THE OPENING

CROSS-REFERENCE TO RELATED APPLICATION

This application claims priority to DE 10 2015 219 286.5 filed Oct. 6, 2015, the entire disclosure of which is incorporated by reference herein.

TECHNICAL FIELD

The disclosure herein relates to a device for controlling an opening forming an air inlet or air outlet in an outer skin of a vehicle as well as an aircraft with such a device. In particular, the disclosure herein relates to a device for determining at least one of a degree of opening of the opening in the outer skin and a cross section of an air duct connected to the opening.

BACKGROUND

Air inlet and air outlet openings are required in vehicles to provide the interior of the vehicle with fresh air or to make an air flow available to a cooling device as a heat sink. However, these openings cause turbulence on the outer skin of the vehicle. The air resistance of the vehicle is adversely influenced by this.

In aircraft, in particular planes, it is also advantageous to be able to control the size of the opening of such air inlets and air outlets. During flight operation, the opening cross section can be smaller than in ground operation, for example, as due to a high airspeed and mostly cold outside air a small opening is sufficient. In ground operation, on the other hand, a larger opening is advantageous to be able to provide at least one of sufficient fresh air and cooling air.

European patent application EP 14 163 363 relates to a ram air opening with a flexible flap, which consists of two rigid elements and a flexible element arranged in between. The flap is supported articulatedly at its outer ends. The cross section of an air passage can be varied by moving the flap.

Due to the air flows, the flap is partly exposed to strong pressures and vibrations. These must be taken up by the flap and an actuator moving the flap. The flap and the actuator must therefore be of stronger dimensions, giving rise to additional weight.

SUMMARY

An object of the present disclosure is to provide a device for controlling an opening forming an air inlet or air outlet in an outer skin of a vehicle, the degree of opening of which can be varied by simple means, wherein the device is to be configured to be as light and small as possible.

According to a first aspect of the present disclosure, a device for controlling an opening forming an air inlet or air outlet in an outer skin of a vehicle comprises a multiple-member inlet ramp, which is configured to vary at least one of a degree of opening of the opening and a cross section of an air duct connected to the opening. The opening can be a ram air opening and the duct connected to it can be a ram air duct. However, the opening can also form an air outlet, wherein the duct is likewise connected to the opening, but lies upstream in the flow direction of an air flow.

The device further comprises an actuator, which is coupled to the multiple-member inlet ramp and is configured to move the multiple-member inlet ramp into a shape related to at least one of a certain degree of opening and a certain cross section. To do this, the actuator can be integrated into the multiple-member inlet ramp. The actuator can be arranged such that it moves in a longitudinal direction of the inlet ramp and exerts a force on the multiple-member inlet ramp in a longitudinal direction. The shape of the multiple-member inlet ramp is changed by the movement of the actuator.

The multiple-member inlet ramp is configured in such a way that a first member (element) is moved by the actuator in such a way that it is placed over the opening in the outer skin and closes it. A second member (element) of the multiple-member inlet ramp is moved by the actuator in such a way that it varies the size of the cross section of the air duct connected to the opening. The first and second member (element) of the inlet ramp can be connected either directly to one another or indirectly via another member (element). The inlet ramp can comprise any number of members (elements).

The multiple-member inlet ramp is configured so that it has a zero position, in which the length of the inlet ramp is minimal. By extending and contracting the actuator, the shape of the multiple-member inlet ramp is changed. The actuator can be arranged in such a way that an extension of the actuator causes a lengthening of the multiple-member inlet ramp in its longitudinal direction and a contraction of the actuator causes a shortening of the multiple-member inlet ramp in its longitudinal direction. Due to this, the multiple-member inlet ramp can be brought into a shape in which its length is maximal. It is advantageous to this end if one or more of the members (elements) of the inlet ramp are configured flexibly, so that a length change in the inlet ramp can take place without holes/openings arising in the inlet ramp.

The first and second member (element) of the multiple-member inlet ramp can be connected to one another in such a way that from the zero position a movement of the inlet ramp in a first direction closes the opening in the outer skin by the first member (element), for example, and at the same time reduces the cross section of the air duct, for example by the second member (element). In a movement of the inlet ramp from the zero position in a second direction opposite to the first direction, the opening in the outer skin can be opened completely and at the same time the cross section of the air duct can be maximized.

The actuator can be coupled to the multiple-member inlet ramp at a connection point of the first and second member (element) or of the other member (element). Due to this, the actuator can move both the first and the second member (element) of the inlet ramp by its movement. Moreover, several actuators can be used to vary the shape of the multiple-member inlet ramp. For example, one or more actuators can be provided at each connection point of two members (elements).

The actuator can comprise a piezoelectric element. This facilitates at least one of an extension and a contraction of the actuator. The piezoelectric element can thus be configured so that it can be moved in two directions. For example, the actuator can be moved in a first direction by applying a certain voltage to the piezoelectric element. The extent of the movement (for example, forward stroke of the actuator) is a function in this case of the magnitude of the voltage. By applying a negative voltage, the piezoelectric element can be moved in a second direction opposite to the first direction. Here, too, the extent of the movement (for example, return stroke of the actuator) can be determined by the magnitude of the negative voltage. If no voltage is applied to the piezoelectric element, this returns to a zero position. By extending and contracting the piezoelectric element (the actuator), the shape of the multiple-member inlet ramp is changed. The extension of the piezoelectric element can cause a lengthening of the multiple-member inlet ramp in its longitudinal direction and the contraction of the piezoelectric element can cause a shortening of the multiple-member inlet ramp in its longitudinal direction.

The device can further comprise a movement control device, which is configured to control a movement of the multiple-member inlet ramp caused by the actuator. By controlling the movement, the multiple-member inlet ramp can be moved from the zero position, for example, in the first or the second direction.

The movement control device can comprise a hydraulic element for this. The hydraulic element can be configured to facilitate or prevent a transverse movement of the multiple-member inlet ramp in a direction different from a longitudinal direction of the multiple-member inlet ramp. For example, the hydraulic element can move forwards and backwards in a hydraulic fluid. By permitting the supply or draining of the hydraulic fluid, the position of the hydraulic element can be controlled. In particular, a transverse movement of the multiple-member inlet ramp from a zero position can be controlled by the movement control device.

The movement control device can be configured so that it controls the movement of the multiple-member inlet ramp caused by the actuator from its zero position to a completely open inlet ramp shape or to a closed inlet ramp shape. This offers the advantage that the shape of the inlet ramp in operation, during which the shape of the inlet ramp has to be changed from time to time, can be controlled quickly by the actuator. Following the movement, the movement control device can block a (further) movement of the multiple-member inlet ramp. For a longer lasting period with the same inlet ramp shape (for example, in ground operation or in the case of complete closure of the opening), the shape of the inlet ramp can be maintained by the movement control device. The actuator can thus be "turned off", so that no further force is exerted on the inlet ramp by the actuator. The energy consumption for the actuator can be reduced or avoided completely in this case. In particular, a hydraulic element of the movement control device can be held in a fixed position entirely without consuming energy, for example by closing valves in relevant hydraulic lines.

The hydraulic element can comprise a hydraulic piston for this, which is coupled mechanically to the multiple-member inlet ramp. The mechanical coupling of the piston to the multiple-member inlet ramp is realised here via a rigid connecting rod or piston rod. The hydraulic piston is also arranged in a cylinder. The piston can be configured to transmit a force arising upon the transverse movement of the multiple-member inlet ramp to a hydraulic fluid on one of two sides of the piston. By permitting the supply or draining of hydraulic fluid to/from the cylinder, the piston can be moved in a first direction or a second direction opposed to the first direction by a force exerted by the multiple-member inlet ramp on the connecting rod.

Alternatively or in addition, a hydraulic fluid under pressure can act on one of two sides of the piston respectively. Here the piston is configured to move back and forth as a function of the side on which the hydraulic fluid acts. By supplying hydraulic fluid to one piston side, the piston is moved in a first direction. Accordingly, by supplying hydraulic fluid to an opposing piston side, the piston is moved in a second direction opposite to the first direction. The hydraulic fluid on the respectively opposing piston side must be able to escape from the cylinder to enable the movement of the piston.

The movement control device can comprise at least one control valve, which is connected to the hydraulic element via at least one hydraulic line. By opening a control valve, hydraulic fluid is conducted to the hydraulic element or conducted away from this.

Of the at least one control valve here, a first control valve can be configured to supply a hydraulic fluid to the hydraulic element via a first hydraulic line by opening. The hydraulic fluid on the side of the control valve facing away from the hydraulic element can be under a slight pressure, which is greater than the pressure of the hydraulic fluid prevailing in the hydraulic element. This supports the movement of the hydraulic element.

Of the at least one control valve, a second control valve can further be configured to conduct the hydraulic fluid away from the hydraulic element via a second hydraulic line by opening. Here the hydraulic fluid on the side of the control valve facing away from the hydraulic element can be under a slight pressure, which is smaller than the pressure of the hydraulic fluid prevailing in the hydraulic element. This likewise supports the movement of the hydraulic element. Alternatively, the hydraulic fluid is only exposed to atmospheric pressure.

Alternatively the at least one control valve can be (comprise) a three-way valve, which is configured to supply a hydraulic fluid to the hydraulic element via a first hydraulic line in a first switching position, and to conduct the hydraulic fluid away from the hydraulic element via a second hydraulic line in a second switching position. The three-way valve can have three connections. The first and second hydraulic line can be connected to two of the three connections, while a third connection is coupled to another hydraulic line.

According to a configuration of the device, the movement control device can comprise a hydraulic reservoir. The at least one control valve can be connected here via a respective hydraulic line to the hydraulic reservoir. In the case of two control valves, both control valves can be connected to the hydraulic reservoir via a respective hydraulic line. Hydraulic fluid can be conducted due to this via a first of the two control valves from the hydraulic reservoir to the hydraulic element and via a second of the two control valves hydraulic fluid can be conducted from the hydraulic element to the hydraulic reservoir.

The hydraulic reservoir can also comprise an air reservoir. The air reservoir can be configured to exert an air pressure on a hydraulic fluid in the hydraulic reservoir in a controlled or uncontrolled manner. In the case of an uncontrolled exertion of pressure, the air pressure is increased by supplying hydraulic fluid to the hydraulic reservoir. A resistance in the form of a counterpressure increases in the hydraulic reservoir due to this, which can be used to control the movement of the multiple-member inlet ramp by the movement control device.

The air pressure prevailing in the hydraulic reservoir can cause damping in the hydraulic element. For example, the control valve, which permits hydraulic fluid to be conducted away from the hydraulic element into the hydraulic reservoir, can be opened. If a force is now exerted on the piston, so that this presses against the hydraulic fluid in the hydraulic element, the pressure in the hydraulic fluid can be conducted into the hydraulic reservoir via the corresponding hydraulic lines and the open control valve. There the air can be compressed in the air reservoir, due to which damping of the force exerted on the piston takes place. Advantageously a control valve, which otherwise permits a supply of hydraulic fluid from the hydraulic reservoir to the hydraulic element, is closed in this case.

According to a further configuration, a first and second hydraulic line can be connected to a first side of the hydraulic element and two connections of a three-way valve. The three-way valve can further be connected via a third hydraulic line to a second side of the hydraulic element. Depending on the switching position of the three-way valve, it is thus possible to convey hydraulic fluid from one side of the hydraulic element to an opposing side. For example, by exerting a force on the piston, a pressure can be built up on the hydraulic fluid on a first side of the hydraulic element. Correspondingly a negative pressure is also built up on the opposing side of the hydraulic element in the hydraulic fluid. By a corresponding switching position of the three-way valve, a balancing of the pressures in the hydraulic fluid and thus a movement of the hydraulic element and thus of the multiple-member inlet ramp can be controlled.

Furthermore, the hydraulic element can comprise an air reservoir on one side. This air reservoir can be configured to exert an air pressure on a hydraulic fluid in the hydraulic element in a controlled or uncontrolled manner. As described regarding the air reservoir in the hydraulic reservoir, the air reservoir in the hydraulic element can cause damping.

The air reservoirs described can operate in a controlled or uncontrolled manner. A controlled air reservoir can be acted upon by a corresponding device with an air pressure, thus air supplied to the air reservoir. A compressed air source, such as a pump or compressor, for example, can be used for this. Likewise, air can be released from the air reservoir. This can be accomplished by at least one of another control valve and a vacuum pump.

An uncontrolled air reservoir can comprise a predetermined, closed volume. The air pressure in the air reservoir is changed due to this according to the pressure in the hydraulic fluid. Alternatively or in addition, an excess pressure valve can be connected to the uncontrolled air reservoir, in order to limit the air pressure and thus the pressure in the hydraulic fluid. A negative pressure (below atmospheric pressure) can likewise be avoided in the air reservoir by an excess pressure valve acting in reverse.

Furthermore, the hydraulic element on one side can comprise a spring element, which is coupled to the piston. Alternatively, the spring element is coupled to the multiple-member inlet ramp independently of the hydraulic element. For example, the spring element can exert a spring force on the connecting rod and thus on the multiple-member inlet ramp outside the hydraulic element.

According to a second aspect, an aircraft is disclosed with an opening forming an air inlet or air outlet in an outer skin of the aircraft. The aircraft can comprise the device described above in this case.

BRIEF DESCRIPTION OF THE DRAWINGS

Preferred embodiments of the disclosure herein are now explained with reference to the enclosed schematic drawings, in which.

DETAILED DESCRIPTION

Figure 1:
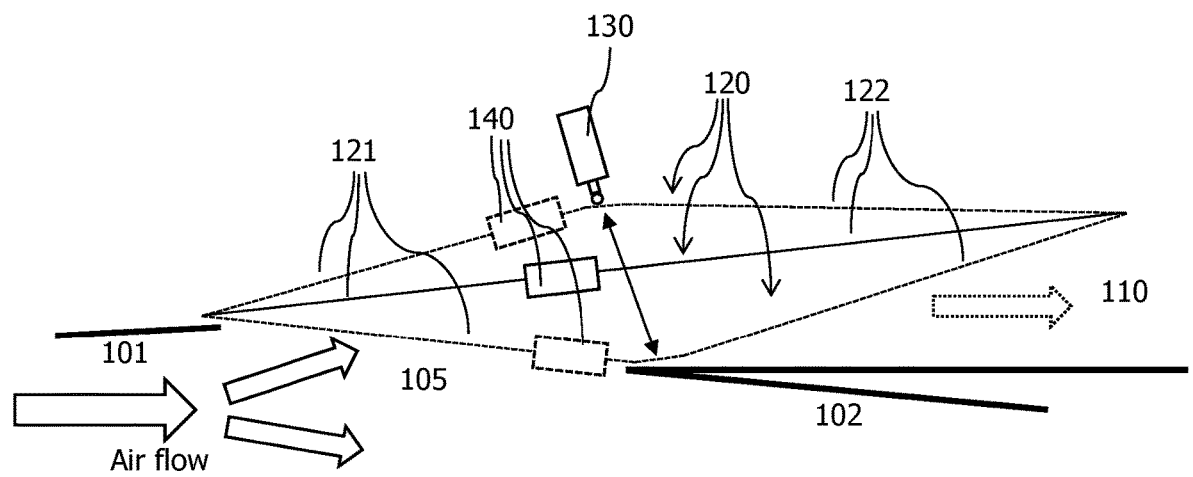
FIG. 1 shows a schematic, simplified representation of an air inlet opening with a device according to the present disclosure.

FIG. 1 shows schematically a heavily simplified representation of an air inlet opening in an outer skin of a vehicle. The device and function shown here can self-evidently also be used on an air outlet opening.

An opening 105 is formed in the outer skin 101, 102 of the vehicle. By way of illustration, a normal direction of travel of the vehicle is to the left in FIG. 1, so that during the travel the air flow shown arises from left to right. The air flow flows in this case over a first section 101 of the outer skin and a second section 102 of the outer skin. Located in between is the opening 105, so that the air flow can separate at the tip (left side) of the second outer skin section 102. A portion of the air flow can thus flow into the opening 105. This is shown by corresponding arrows representing the air flow in FIG. 1. After the opening 105, a portion of the air flow can flow in an air duct 110 connected to the opening. This air duct 110 can lead to at least one of a fresh air unit and a cooling unit of the vehicle, where the air flow, represented by a dotted arrow, is used in the air duct 110.

Located at the opening 105 and in the air duct 110 is a multiple-member inlet ramp 120, which is configured to vary at least one of a degree of opening of the opening and a cross section of the air duct 110 connected to the opening 105.

The multiple-member inlet ramp 120 shown comprises a first member (element) 121 and a second member (element) 122. The first 121 and second member (element) 122 of the inlet ramp 120 can be connected either directly or indirectly via one or more other member/s (element/s). In FIG. 1, the multiple-member inlet ramp 120 is shown once by a continuous line and twice by a dashed line. These illustrations show the inlet ramp 120 in a zero position (continuous line), a closed state (lower dashed line) and a completely open state (upper dashed line). The states of the inlet ramp 120 shown in FIG. 1 are used only for better visualisation. The disclosure is not restricted to the shapes and angles of the members shown.

To move the multiple-member inlet ramp 120, one or more actuators 140 are provided. The actuator 140 is coupled to the multiple-member inlet ramp 120. The multiple-member inlet ramp 120 can be moved by the actuator 140 into any shape between the closed state and the fully open state. From the zero position the inlet ramp 120 can be moved downwards, so that the first member (element) 121 is placed over the opening 105 in the outer skin 101, 102. At the same time, the second member (element) 122 is moved so that it varies the size of the cross section of the air duct 110 connected to the opening 105. In this case the first 121 and second member (element) 122 can be connected to one another in such a way that a movement of the actuator 140 causes a movement of the inlet ramp 120 either in a first direction towards the opening 105 or in a second direction opposed to the first direction away from the opening 105.

The actuator 140 can be coupled at a connecting point of the first 121 and second member (element) 122 or of the other member (element) to the multiple-member inlet ramp 120. Due to this, the actuator can by its movement move both the first 121 and the second member (element) 122 of the inlet ramp 120 and change the shape of the inlet ramp by changing its length.

The actuator 140 can comprise a piezoelectric element. The piezoelectric element can be configured in such a way that it can be moved in two directions. For example, by applying a certain voltage to the piezoelectric element, the actuator can be moved in a first direction. The extent of the movement (for example, forward stroke of the actuator) depends in this case on the magnitude of the voltage. By applying a negative voltage, the piezoelectric element can be moved in a second direction opposed to the first direction. Here, too, the extent of the movement (for example, return stroke of the actuator) can be determined by the magnitude of the negative voltage. If no voltage is applied to the piezoelectric element, this returns to the zero position.

By expanding and contracting the actuator 140 (the piezoelectric element), the shape of the multiple-member inlet ramp 120 can be changed. In this case the expansion of the actuator 140 causes a lengthening of the multiple-member inlet ramp 120 in its longitudinal direction and the contraction of the actuator 140 causes a shortening of the multiple-member inlet ramp 120 in its longitudinal direction.

The movement control device 130 can now control a transverse movement of the multiple-member inlet ramp 120 caused by the movement of the actuator 140. In other words, the transverse movement of the multiple-member inlet ramp 120 can be changed from the zero position by the movement control device 130. This is now explained in greater detail with reference to FIGS. 2 to 6.

Figure 2:
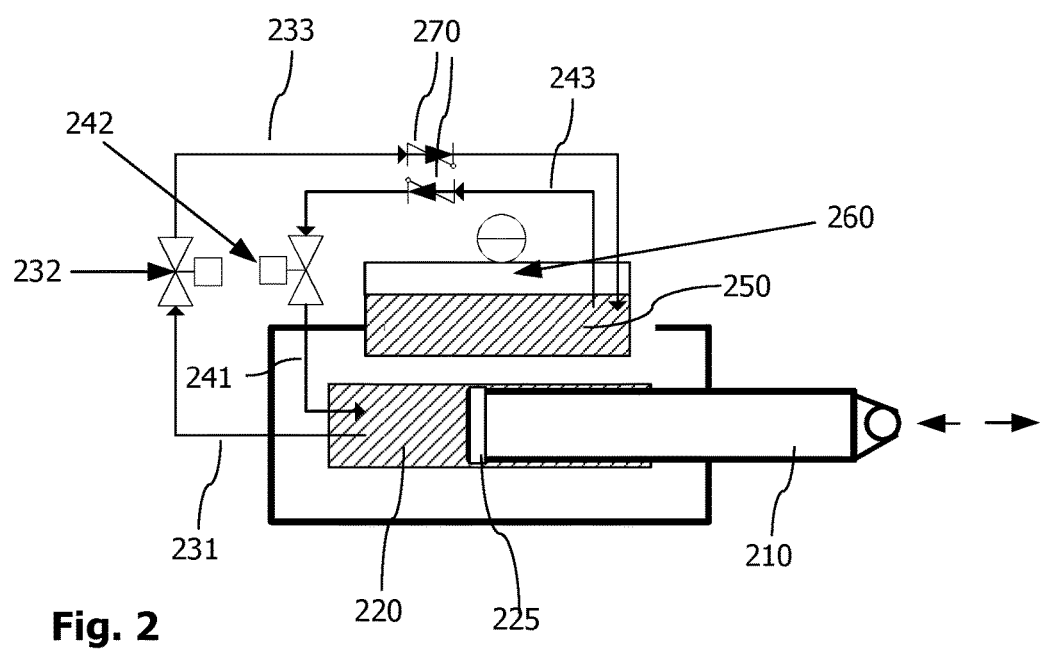
FIG. 2 shows a schematic representation of a first configuration of a movement control device with two separate hydraulic lines and respectively related control valve.

FIG. 2 shows a schematic representation of a first configuration of a movement control device 130 with two separate hydraulic lines and respectively related control valve. The movement control device 130 is coupled by a connecting rod or piston rod 210 to the multiple-member inlet ramp 120 (not shown in FIG. 2).

The movement control device 130 comprises a hydraulic element 220. The hydraulic element 220 can change the position of the rod 210 or the rod 210 can be moved by the effect of a force from the inlet ramp 120. A transverse movement of the multiple-member inlet ramp 120 in a direction different from a longitudinal direction of the multiple-member inlet ramp 120 can be facilitated or prevented by this. To do this, the hydraulic element 220 comprises a hydraulic piston 225, which is coupled mechanically to the inlet ramp 120 via the rod 210.

The hydraulic element 220 further comprises a cylinder, in which the piston 225 can move. The volume of the cylinder, which is shown hatched in FIG. 2 to the left of the piston 225, is filled with a hydraulic fluid. A first hydraulic line 231 and a second hydraulic line 241 are connected to this volume. Hydraulic fluid can be removed from the cylinder through the first hydraulic line 231, while hydraulic fluid can be conducted into the cylinder through the second hydraulic line 241. A control valve 232, 242 is connected respectively to each of the two hydraulic lines 231, 241. By respectively opening and closing the control valve 232, 242, hydraulic fluid can be supplied to or drained from the cylinder of the hydraulic element 220. Each of the control valves 232, 242 can be controlled separately and have any degree of opening. The quantity of the hydraulic fluid supplied and removed and/or the speed with which the hydraulic fluid is supplied and removed can be determined due to this by a corresponding control unit (not shown).

The piston 225 is configured to transmit a force arising upon the transverse movement of the multiple-member inlet ramp 120 to the hydraulic fluid in the cylinder on one of two sides of the piston 225. Due to this force and corresponding opening of one of the control valves 232, 242, the hydraulic fluid can escape from or flow into the cylinder. The movement (in particular the transverse movement) of the inlet ramp 120 can thus be controlled, so that the inlet ramp 120 can be moved into any shape by the force applied by the actuator 140. The shape of the inlet ramp 120 can be maintained by subsequent closing of all control valves 232, 242 without a force having to be applied by the actuator 140. If the inlet ramp 120 is in its zero position, the movement control device 130 can enable the (transverse) movement of the inlet ramp 120 in a certain direction and prevent/block it in the other direction by selective opening of one of the control valves 232, 242. With reference to FIG. 1, the inlet ramp can thus be moved from the zero position by extension of the actuator 140 either downwards or upwards.

In the configuration shown in FIG. 2, the movement control device 130 comprises a hydraulic reservoir 250. Hydraulic fluid that is not needed to fill the cylinder of the hydraulic element 220 (and thus to move the piston 225 and the rod 210) is "stored intermediately" in the hydraulic reservoir 250. Each of the control valves 232, 242 is connected via another corresponding hydraulic line 233, 243 to the hydraulic reservoir 250. Hydraulic fluid can thus be conducted from the hydraulic reservoir 250 into the hydraulic element 220 or vice-versa by suitable opening and closing of the respective control valve 232, 242.

The hydraulic fluid can be moved by conveying device/s (not shown) in one or more of the hydraulic lines 231, 233, 241, 243. This/these conveying device/s can be executed in the form of one or more pumps, for example.

Alternatively or in addition, the hydraulic reservoir 250 can comprise an air reservoir 260. The air reservoir 260 can be configured to exert an air pressure on the hydraulic fluid in the hydraulic reservoir 250 in a controlled or uncontrolled manner. The hydraulic fluid from the hydraulic reservoir 250 can be conducted into and away from the hydraulic element 220 by a controlled air pressure in the air reservoir 260. For example, by increasing the air pressure in the air reservoir 260 and opening the control valve 242, hydraulic fluid can be conducted into the hydraulic element 220. The rod 210 is moved by this (to the right in FIG. 2). Correspondingly, by reducing the pressure in the air reservoir 260 and opening the control valve 232, hydraulic fluid is conducted from the hydraulic element 220 into the hydraulic reservoir 250. This causes a movement of the rod 210 (to the left in FIG. 2). The air pressure in the air reservoir 260 can be controlled by an air conveying unit (not shown), thus increased or reduced. Alternatively or in addition, the air reservoir 260 can also be connected to a compressed air line and the environment by two other control valves (not shown). By suitable control of these air control valves, the air pressure in the air reservoir 260 can be increased or reduced.

In the case of an uncontrolled air reservoir 260, the air reservoir 260 can act as a damper of the position control device 130. If a (shock-like) pressure is exerted on the rod 210, for example (in FIG. 2 to the left), hydraulic fluid is pushed into the hydraulic reservoir 250 when the control valve 232 is open. By increasing the air pressure in the air reservoir 260, this (shock-like) pressure is damped. Damping also takes place due to a negative pressure arising in the air reservoir 260 on an opposing movement of the rod 210.

Naturally, even in the case of a controlled air reservoir 260, this can act as a damper. To do this, the air reservoir 260 only needs to be closed. Furthermore, the control valves 232, 242 can also be controlled in such a way that they are opened on a pressure increase or pressure reduction in the hydraulic element 220. A hydraulic connection between the hydraulic element 220 and the hydraulic reservoir 250 can be created by this, so that the air reservoir 260 can be used for damping.

In FIG. 2, non-return valves 270 are also shown in the hydraulic lines 233, 243. These serve on the one hand to protect the hydraulic element 220 against excess pressure. On the other hand, they can also be used during damping. For example, the control valves 232, 242 can be opened at least partly. If a pressure is now exerted on the rod 210 (by the multiple-member inlet flap 120), this can be relieved by activating the non-return valves 270 via the hydraulic fluid in the hydraulic reservoir 250 and the air reservoir 260.

FIGS. 3 to 6 show further configurations of the movement control device 130. Elements that are also shown in FIG. 2 are not explained again here. It is rather the case that differences from the configuration according to FIG. 2 are highlighted.

Figure 3:
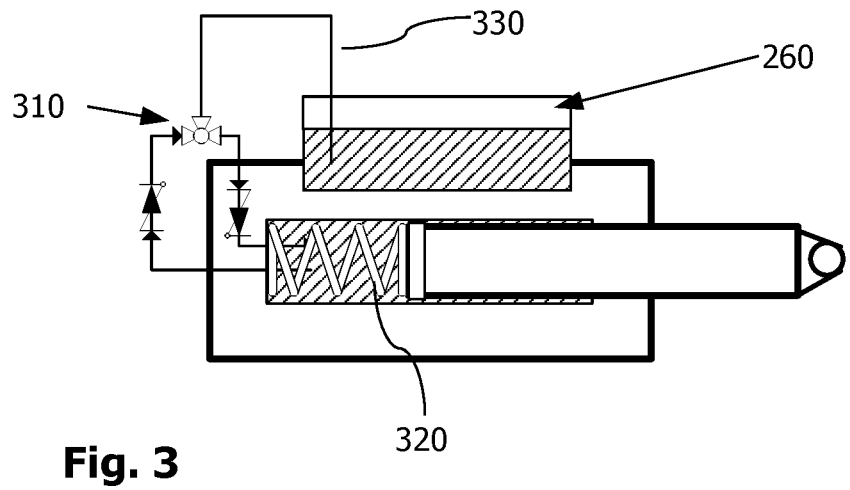
FIG. 3 shows a schematic representation of a second configuration of a movement control device with three-way valve and a spring element in/on the hydraulic element.

FIG. 3 shows a schematic representation of a second configuration of a movement control device 130 with three-way valve 310 and a spring element 320 in/on the hydraulic element 220. The three-way valve 310 replaces the control valves 232, 242 shown in FIG. 2. Here a third connection of the three-way valve 310 is connected to a single hydraulic line 330 to connect the three-way valve 310 to the hydraulic reservoir 250. The three-way valve 310 can be controlled by defined switching positions in such a way that hydraulic fluid is conducted from the hydraulic element 220 via the hydraulic lines 231, 330 into the hydraulic reservoir 250 or in the reverse direction into the hydraulic element 220 via the hydraulic lines 330, 241.

The hydraulic element 220 further comprises a spring element 320 on one side. This spring element 320 is coupled to the piston 225. The spring element 320 counteracts a compressive force applied to the piston 225. Thus damping of the compressive force applied to the piston 225 can be accomplished by the spring element 320. Due to this, the air reservoir 260 can also be executed uncontrolled. As shown in FIG. 3, the air reservoir 260 is connected to the environment (the atmospheric pressure). The spring element can naturally be arranged alternatively or additionally also on the other side of the hydraulic element 220 (on the other side of the piston 225).

Non-return valves 270 are also shown in FIG. 3. Since only one hydraulic line 330 leads to the hydraulic reservoir 250 in the second configuration, the non-return valves 270 are arranged in the hydraulic lines 231 and 241.

Figure 4:
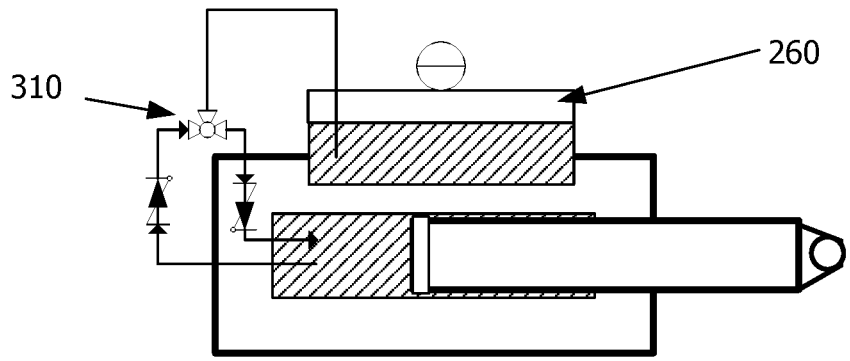
FIG. 4 shows a schematic representation of a third configuration of a movement control device with three-way valve and air reservoir in a hydraulic reservoir.

FIG. 4 shows a schematic representation of a third embodiment of a movement control device 130 with three-way valve 310 and controlled air reservoir 260 in the hydraulic reservoir 250. This third configuration corresponds to a combination of the first and second configuration as shown in FIGS. 2 and 3. However, due to the controlled air reservoir 260, a spring element 320 (see FIG. 3) can be eliminated. Damping can be achieved by the controlled air reservoir 260.

Figure 5:
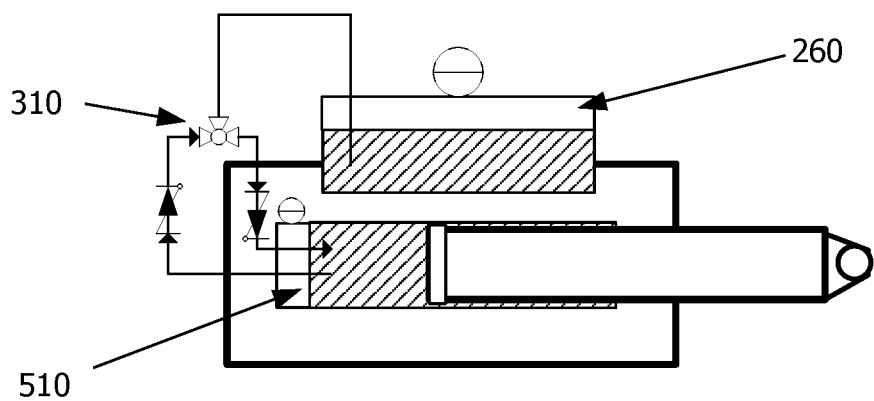
FIG. 5 shows a schematic representation of a fourth configuration of a movement control device with three-way valve and air reservoir in the hydraulic reservoir and the hydraulic element.

FIG. 5 shows a schematic representation of a fourth configuration of a movement control device 130 with three-way valve 310 and air reservoir 260 in the hydraulic reservoir 250 and in addition an air reservoir 510 in the hydraulic element 220. The air reservoir 510 in the hydraulic element 220 can be uncontrolled or controlled. In the case of an uncontrolled air reservoir 510, this assumes a direct damping function without the hydraulic fluid having to be led into the hydraulic reservoir 250. Thus the uncontrolled air reservoir 510 represents an alternative to the spring element 320 shown in FIG. 3.

In the case of a controlled air reservoir 510, both the position of the piston 225 can be changed and a degree of damping can be set. The position of the piston 225 can be varied by the controlled air reservoir 510 in a small range, while for a larger positional change of the piston 225, the hydraulic fluid is moved accordingly between the hydraulic reservoir 250 and the hydraulic element 220.

Figure 6:
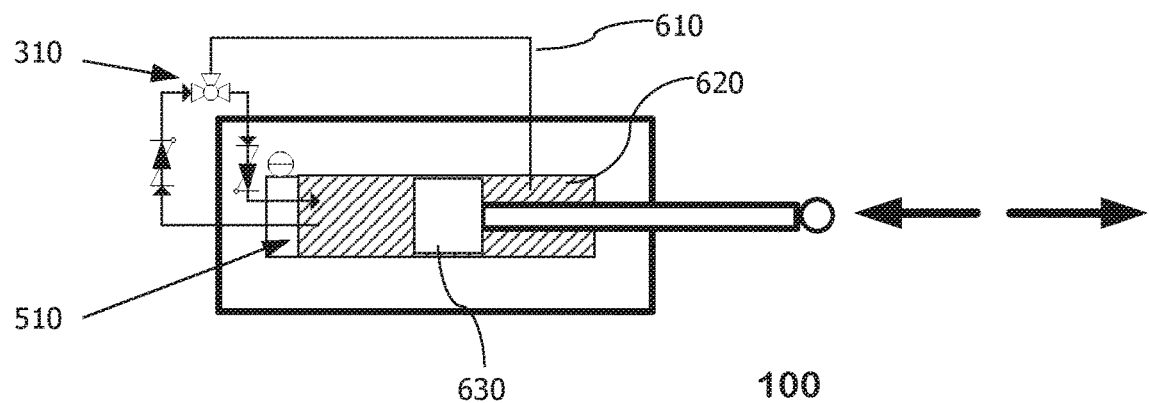
FIG. 6 shows a schematic representation of a fifth configuration of a movement control device with three-way valve and air reservoir in the hydraulic element, wherein the three-way valve is connected via a corresponding hydraulic line to another side of the hydraulic element.

FIG. 6 shows a schematic representation of a fifth configuration of a movement control device 130 with three-way valve 310 and air reservoir 510 in the hydraulic element 220.

In this fifth configuration, the three-way valve 310 is connected via the hydraulic lines 231, 241 to a first side of the hydraulic element 220. In addition, a hydraulic line 610 is connected to the three-way valve 310, which line is connected to a second side 620 of the hydraulic element 220 lying opposite the first side. The piston 630 used in the hydraulic element 220 can thus be moved by conveying the hydraulic fluid from the first side of the hydraulic element 220 to the second side 620. A hydraulic reservoir 250 can be completely eliminated by this. Conveying of the hydraulic fluid in both directions through the hydraulic lines 231, 241 and 610 can be accomplished, for example, by a conveying device (not shown), which can move the hydraulic fluid in both directions.

The air reservoir 510 again serves to damp a compressive force that is exerted on the piston 630.

The rod 210 is shown smaller in FIG. 6. This serves primarily to illustrate the fifth configuration, in order to show the hydraulic fluid on the second side 620 (right side in FIG. 6).

Figure 7:
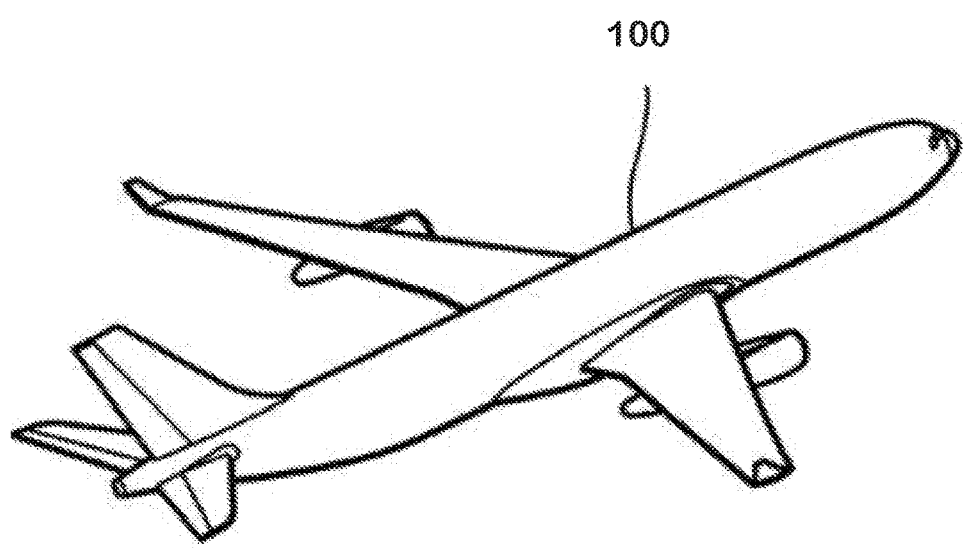
FIG. 7 shows a schematic representation of an aircraft.

FIG. 7 depicts a schematic representation of an aircraft 100.

The present disclosure is not restricted to the five configurations shown, but rather the five configurations show certain elements of the movement control device 130. These elements and functions of the movement control device 130 can be varied with one another in any way. For example, damping by air reservoir or spring element can be dispensed with completely. Alternatively, damping can also be accomplished by one or more spring elements and in addition one or more air reservoirs. Likewise, a controlled and an uncontrolled air reservoir can be used in the hydraulic element and hydraulic reservoir or vice-versa. Furthermore, the hydraulic lines as shown in the first configuration according to FIG. 2 can also be used in any of the second to the fifth configuration. Even the following claims do not restrict the present disclosure in the combination of the various elements and components of the movement control device 130, but rather represent certain embodiments of the present disclosure.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", an or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for controlling an opening forming an air inlet or air outlet in an outer skin of a vehicle, the device comprising:
    a multiple-member inlet ramp comprising at least two flexibly coupled members, the multiple-member inlet ramp being configured to vary at least one of a degree of opening of the opening and a cross section of an air duct connected to the opening;
    an actuator integrated into a longitudinal plane of at least a first member of the flexibly coupled members of the multiple-member inlet ramp and configured to move the multiple-member inlet ramp into a shape related to at least one of a certain degree of opening and a certain cross section; and
    a movement device, which is configured to control a movement of the multiple-member inlet ramp in a transverse direction,
    wherein the actuator is configured to change the shape of the multiple-member inlet ramp by expanding and contracting to exert a force on the first member in the longitudinal plane of the first member, and
    wherein extension of the actuator causes a lengthening of the multiple-member inlet ramp in a longitudinal direction of the multiple-member inlet ramp, and contraction of the actuator causes a shortening of the multiple-member inlet ramp in the longitudinal direction of the multiple-member inlet ramp.

2. The device according to claim 1, wherein the actuator comprises a piezoelectric element.

3. The device according to claim 1, wherein the movement device comprises a hydraulic element, wherein the hydraulic element is configured to enable or prevent a transverse movement of the multiple-member inlet ramp in a direction different from the longitudinal direction of the multiple-member inlet ramp.

4. The device according to claim 3, wherein the hydraulic element comprises a hydraulic piston, which is coupled mechanically to the multiple-member inlet ramp.

5. The device according to claim 4, wherein the piston is configured to transmit a force arising upon the transverse movement of the multiple-member inlet ramp to a hydraulic fluid on one of two sides of the piston.

6. The device according to claim 3, wherein the movement device comprises at least one control valve, which is connected to the hydraulic element via at least one hydraulic line.

7. The device according to claim 6, wherein the movement device comprises a plurality of control valves, including a first control valve configured to supply a hydraulic fluid to the hydraulic element via a first hydraulic line by opening, and a second control valve configured to carry the hydraulic fluid away from the hydraulic element via a second hydraulic line by opening.

8. The device according to claim 6, wherein the at least one control valve is a three-way valve, which is configured to supply hydraulic fluid to the hydraulic element via a first hydraulic line in a first switching position, and to carry the hydraulic fluid away from the hydraulic element via a second hydraulic line in a second switching position.

9. The device according to claim 6, wherein the movement device comprises a hydraulic reservoir, and wherein the at least one control valve is connected to the hydraulic reservoir via a respective hydraulic line.

10. The device according to claim 9, wherein the hydraulic reservoir comprises an air reservoir, which is configured to exert an air pressure on a hydraulic fluid in the hydraulic reservoir in a controlled or uncontrolled manner.

11. The device according to claim 10, wherein the hydraulic element on one side comprises an air reservoir, which is configured to exert an air pressure on a hydraulic fluid in the hydraulic element in a controlled or uncontrolled manner.

12. The device according to claim 8, wherein the first and second hydraulic lines are connected to a first side of the hydraulic element and the three-way valve is connected via a third hydraulic line to a second side of the hydraulic element.

13. The device according to claim 1, wherein the hydraulic element on one side comprises a spring element, which is coupled to the piston.

14. The device according to claim 1, wherein the first member is connected to a second member of the flexibly coupled members of the multiple-member inlet ramp such that, from a length of the multiple-member inlet ramp:
    a movement of the multiple-member inlet ramp in a first transverse direction closes the opening by the first member and reduces the cross section of the air duct by the second member, and
    a movement of the multiple-member inlet ramp in a second transverse direction, which is opposite the first transverse direction, opens the opening completely.

15. An aircraft with an opening forming an air inlet or air outlet in an outer skin of the aircraft, wherein the aircraft comprises a device comprising:
    a multiple-member inlet ramp comprising at least two flexibly coupled members, the multiple-member inlet ramp being configured to vary at least one of a degree of opening of the opening and a cross section of an air duct connected to the opening;
    an actuator integrated into a longitudinal plane of at least a first member of the flexibly coupled members of the multiple-member inlet ramp and configured to move the multiple-member inlet ramp into a shape related to at least one of a certain degree of opening and a certain cross section; and
    a movement device, which is configured to control a movement of the multiple-member inlet ramp in a transverse direction,
    wherein the actuator is configured to change the shape of the multiple-member inlet ramp by expanding and contracting to exert a force on the first member in the longitudinal plane of the first member, and
    wherein extension of the actuator causes a lengthening of the multiple-member inlet ramp in a longitudinal direction of the multiple-member inlet ramp, and contraction of the actuator causes a shortening of the multiple-member inlet ramp in the longitudinal direction of the multiple-member inlet ramp.

* * * * *